Feb. 2, 1937.  A. F. WILLIAMS  2,069,347
EYEGLASS CONSTRUCTION
Filed May 31, 1934
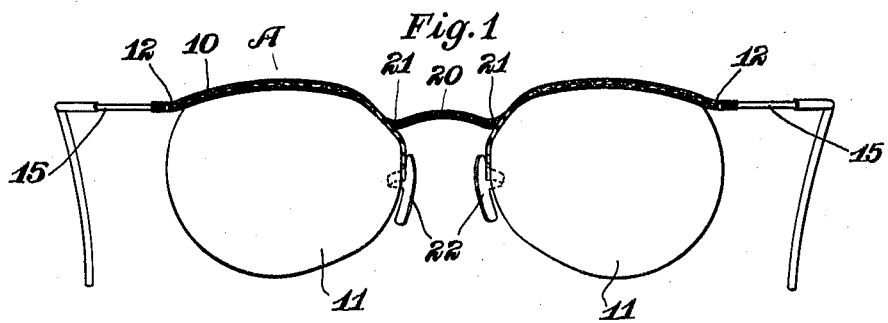
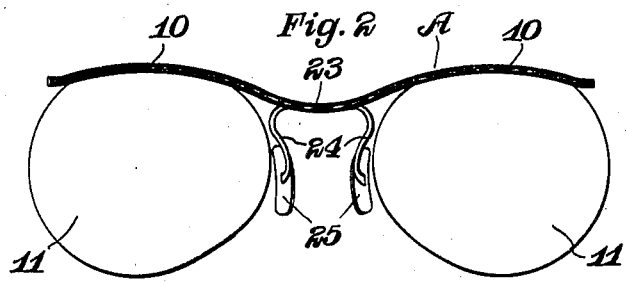
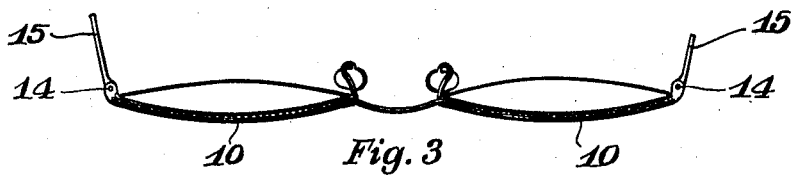
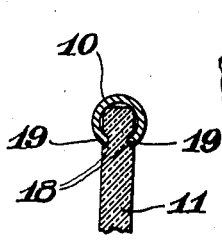 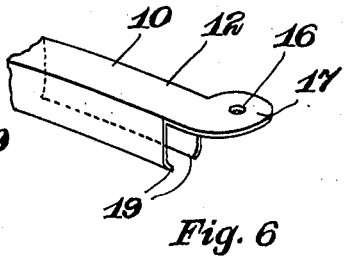 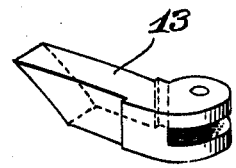
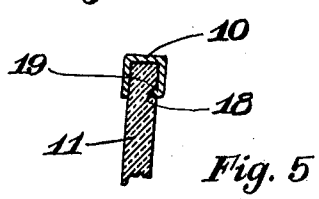
Inventor
Arthur F. Williams
By Honau Fischer
Attorney Patented Feb. 2, 1937

2,069,347

UNITED STATES PATENT OFFICE 2,069,347

EYEGLASS CONSTRUCTION

Arthur F. Williams, St. Paul, Minn.

Application May 31, 1934, Serial No. 728,263

10 Claims. (Cl. 88—47)

My invention relates to eyeglasses wherein the frame for supporting the glasses is provided with means for receiving an arcuated edge of the glass supporting the same from the top thereof.

A feature resides in providing a supporting frame which is formed with an arcuated groove so as to permit the arcuated lenses of the glasses to be slid into the groove of the frame and supported along one edge or at the top thereof.

A further feature resides in a frame for eyeglasses wherein the frame may extend across the face of the wearer generally following the contour of the eyebrows and being provided with a bridge portion for the nose which holds the frame in proper position to support the lenses of the glasses in front of the eyes.

My eyeglasses are also constructed to provide a frame following the eyebrows of the wearer and carrying the bows high on the side of the temple to give a clear vision under the bows. The temple supporting means is also removable from the frame so as to open one end of the channel in the frame which receives the lens of the glasses. Thus I provide eyeglasses which are of an extremely simple character, having a segmental frame which engages one edge of the lens to hold the same in place. With my glasses the profile of the wearer is not impaired or detracted from. Further, there is no rim on the lower portion of the glass which tends to obstruct, detract or cast a reflection in the line of vision of the wearer of my glasses.

The features and details of the structure of my eyeglasses will be more fully and clearly defined throughout the specification and claims.

In the drawing forming part of this specification:

Figure 1 is a front view of a form of my eyeglasses, showing the bows extending therefrom.

Figure 2 illustrates a front view of another form of my eyeglasses with the bows removed.

Figure 3 is a plan view, looking down on the upper edge of my eyeglasses.

Figure 4 is an enlarged sectional detail through the frame and a portion of a lens of my eyeglasses, showing one form of the frame.

Figure 5 is a similar view, showing a different form of the frame.

Figure 6 is an enlarged detail of a portion of one end of the frame.

Figure 7 is an enlarged detail of the bow support and stop which fits into the end of the frame illustrated in Figure 6 to hold the lens in place in the same.

My eyeglasses A are formed with segmental rim frame portions 10 which may be of a tubular nature having a round or an angular cross section. The rim portions 10 are arcuated to conform with the curve of the eyebrows in one direction, as illustrated from the front views of the same, and arcuated in another direction, as illustrated in the top view of Figure 3, to conform with the arcuated contour of the lenses 11.

In the present form of eyeglasses the lenses are usually shaped with curved edges to give the desired shape to the top of the same. These lenses are also arced away from the eye so as to permit the lenses to fit closer to the eyes. This improves the vision and follows more closely the contour of the face of the wearer. My frame portions 10 are formed to take care of these respective arcs so as to receive the lenses 11 by sliding them in from the bow supporting end 12. The ends 12 of the rim frame portions 10 are adapted to be closed by the stops 13 and the screws 14 which hold the bows 15 in place in the ends of the stops 13 also engaging through the opening 16 in the end 17 formed on the ends 12 of the frame so as to anchor the stop 13 in place.

The lenses 11 are formed with grooves 18 which are engaged by the inturned edges 19 of the frame portions 10 to hold the lenses 11 in the channel of the frame. The lenses 11 may be further secured in the frame portions 10 by a suitable cementing material. Thus the lenses 11 may be anchored firmly in the frame portions 10 along the top edges of the lenses.

The frame portions 10 are adapted to be joined by the bridge 20 which is formed with ends 21 connecting the bridge with the inner ends of the frame portions 10. The bridge is adapted to support the nose engaging pads 22 and the end portions 21 may act as shoulders or stops for the inner edges of the lenses, when the bridge 20 is formed as illustrated in Figure 1.

The bridge 20 may be of spring material so as to form a flexible connection between the portions 10, or it may be of a rigid character. In Figure 2, the bridge 23 is of a thin spring nature and connects the portions of the frame 10 together. In the form of the bridge 23 depending spring arms 24 support the nose engaging pads 25. This form of my glasses may be used with or without the bows 15.

In the present form of glasses where it is desirable that the lenses curve away from the eye lashes and conform to the arc of rotation of the eyes, it is necessary to provide curved frame portions 10 which are arcuated to the curve of the top of the lens and also to conform with the outward curve of the lens. This I have accomplished in my frame portions 10 which are flexible enough to receive the lenses 11 by engaging in the grooves 18, as illustrated in Figure 4. The lens 11 may be formed with one groove 18 as illustrated in Figure 5. If it is desirable, a cement of a suitable character may be used to rigidly anchor the lenses 11 to the frame portions 10.

My glasses are formed to provide a segmental frame portion which supports the lenses 11 and may be designed to follow the contour of the eyebrows of the wearer, the lenses 11 being made accordingly. It is apparent that the lens may be slipped into the channel of the frame portion 10 when the stop portion 13 is removed from the end 12 of the frame.

The frames of my glasses may be formed of metal, shell, or any other similar material which is adapted to provide segmental frame portions having sufficient rigidity to support the lenses in the desired position. The advantage of the segmental frame portions of my glasses is apparent in that the lenses may be supported along the eyebrow edge, which is the portion of the lens least apt to obstruct the vision, because the wearer in looking up, usually raises the head. The segmental portions are of a fine, arcuated character so that even in looking upward, the vision is not materially obstructed.

My glasses A are designed to be comparatively inconspicuous and do not detract from the facial features or profile of the wearer, but are of a pleasing design, having the advantage of unobstructed vision from edge to edge, sideways and to the lower edge as well.

I claim:

1. Eyeglasses including lenses, arcuate frame portions, arquate lens receiving channels, having opposed inturned edges spaced a distance less than the thickness of the lenses, formed in said frame portions to engage and support said lenses, a bridge portion connecting said frame portions, and removable end means slidably positioned in each channel closing said channel at the outer ends of said frame portions, said end means forming a shoulder to prevent sliding of said lenses.

2. Eyeglasses including lenses having an arcuate edge, a frame formed with arcuate lens receiving channels having inturned edges spaced apart a distance less than the thickness of the lenses, arcuate grooves along said arcuate lens edges for slidable engagement with the inturned edges on said frame, and end members slidably engageable in the ends of said channels to close the ends of said channels and to prevent disengagement of said lenses.

3. Eyeglasses comprising lenses having an arcuate edge, arcuated flexible segmental channel frame portions adapted to slidably receive said arcuated lenses, groove means formed along said arcuate edge of the lenses to slidably fit in said channel portions, bridge means connecting said channel portions, and removable end members slidably engageable by said channel portions engageable with said lenses to prevent sliding thereof.

4. Glasses including segmental rim portions in the form of arcuated channels having lens engaging edges, to contain, engage, and support lenses; lenses having cooperating arcuated groove means engageable with said edges in said rim portions, the engagement terminating adjacent the upper periphery of the lenses, and bridge means connecting said rim portions.

5. Glasses including segmental rim portions in the form of arcuated channels having lens engaging edges, to contain, engage, and support lenses; lenses having cooperating arcuated groove means engageable with said edges in said rim portions, the engagement terminating adjacent the upper periphery of the lenses, bridge means connecting said rim portions and holding them in spaced relationship, and adhesive means for holding said lenses in said channel rim portions.

6. Glasses including lenses, segmental arcuated channel shaped rim frame portions engaging said lenses, the engagement terminating adjacent the upper periphery of the lenses, said frame portions having open ends extending beyond the periphery of the lenses, lens engaging edge means on said channel shaped rim frame, said lens being grooved to accommodate said engaging edge means, and removable shoulders slidably engaged in the said open ends of said frame to close the outer ends of said lens receiving recess means holding the lenses engaged therein.

7. Glasses including lenses, frame portions extending across the upper portion only of the lenses and having an arcuated formation throughout their length, said lenses having arcuated grooves extending along, and spaced from, the upper edge of the same, and means on said frame extending into the grooves to hold the lenses in place secured to said frame.

8. Glasses including lenses having an arcuated upper periphery, channel frame portions having an arcuated formation following the upper contour of the lens and an arcuation following the toric arc of the lens, said lenses having oppositely disposed grooves in the oppositely disposed faces thereof extending along said arcuated periphery, engaging edges on said frame extending into said grooves, said frame portions extending only along the upper periphery of the lenses, and adhesive means for fixing the lenses in said frame portions.

9. Glasses including concaved lens means, an arcuated edge thereon, said lens having oppositely disposed grooves therein following the upper contour of said edge, and a channel frame doubly arcuated to conform with the concavity of the lens and with the arcuation of the lens edge, said frame including edges engageable in said grooves.

10. Glasses including a concaved lens having oppositely disposed surfaces, an arcuated edge thereupon, said lens having groove means in a surface thereof, said groove means substantially following the upper contour of said arcuated edge, and a channel frame including an edge engageable in said groove means, said frame being curved to fit the concavity of the lens, and curved to fit the arcuated edge of the lens, said channel frame engaging said lens only adjacent the upper periphery of the lens.

ARTHUR F. WILLIAMS.